(12) United States Patent
Suzuki et al.

(10) Patent No.: US 10,809,058 B2
(45) Date of Patent: Oct. 20, 2020

(54) ROAD SURFACE ASSESSMENT APPARATUS FOR VEHICLE

(71) Applicant: SUBARU CORPORATION, Tokyo (JP)

(72) Inventors: Dan Suzuki, Tokyo (JP); Makoto Kinoshita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 22 days.

(21) Appl. No.: 16/032,201

(22) Filed: Jul. 11, 2018

(65) Prior Publication Data
US 2019/0078877 A1   Mar. 14, 2019

(30) Foreign Application Priority Data
Sep. 14, 2017   (JP) .................... 2017-176576

(51) Int. Cl.
| | |
|---|---|
| *G01N 21/00* | (2006.01) |
| *G01B 11/30* | (2006.01) |
| *B60Q 1/00* | (2006.01) |
| *B60T 8/17* | (2006.01) |
| *B60T 8/00* | (2006.01) |

(52) U.S. Cl.
CPC .............. *G01B 11/303* (2013.01); *B60Q 1/00* (2013.01); *B60T 8/00* (2013.01); *B60T 8/17* (2013.01); *G01B 11/306* (2013.01); *B60T 2210/12* (2013.01)

(58) Field of Classification Search
CPC ..... G01B 11/303; G01B 11/30; G01B 11/306; G01B 11/0691; G01N 21/88; B60Q 1/26; B60Q 1/0023; B60Q 1/143; B60Q 1/50

USPC .......... 356/237.1–237.5, 600, 603, 614–623; 382/149, 108

See application file for complete search history.

(56) References Cited

U.S. PATENT DOCUMENTS

| | | | | |
|---|---|---|---|---|
| 4,653,316 A | * | 3/1987 | Fukuhara | G01C 7/04 33/551 |
| 5,163,319 A | * | 11/1992 | Spies | B60G 17/019 356/601 |

(Continued)

FOREIGN PATENT DOCUMENTS

| | | |
|---|---|---|
| JP | 2003-231438 A | 8/2003 |
| JP | 2006-069298 A | 3/2006 |

(Continued)

OTHER PUBLICATIONS

Japanese Office Action dated Mar. 26, 2019 for JP 2017-176576 (4 pages in Japanese with English translation).

*Primary Examiner* — Hoa Q Pham
(74) *Attorney, Agent, or Firm* — Smith, Gambrell & Russell, LLP

(57) ABSTRACT

A road surface assessment apparatus for a vehicle includes an illumination device, a detector, and an assessment unit. The illumination device is configured to emit pattern light to a road surface on which the vehicle runs, or a surrounding of the vehicle. The detector is configured to detect the emitted pattern light. The assessment unit is configured to assess a condition of the road surface, on the basis of the detected pattern light. The illumination device intermittently emits the pattern light for a short time in such a manner that a period of time for which the pattern light is not emitted is longer than a period of time for which the pattern light is emitted.

19 Claims, 8 Drawing Sheets

(56) References Cited

U.S. PATENT DOCUMENTS

| | | | | |
|---|---|---|---|---|
| 6,285,778 | B1* | 9/2001 | Nakajima | G05D 1/0248 |
| | | | | 180/167 |
| 6,658,137 | B1* | 12/2003 | Yuhara | B60R 16/0237 |
| | | | | 382/104 |
| 7,158,218 | B2* | 1/2007 | Arita | G01S 17/936 |
| | | | | 342/70 |
| 10,118,537 | B2* | 11/2018 | Kunii | H04N 9/3185 |
| 2003/0147247 | A1 | 8/2003 | Koike | |
| 2010/0328644 | A1* | 12/2010 | Lu | G01S 7/4802 |
| | | | | 356/5.01 |
| 2011/0181713 | A1* | 7/2011 | Ohkubo | G01N 21/4738 |
| | | | | 348/135 |
| 2016/0097844 | A1* | 4/2016 | Takano | G01S 17/89 |
| | | | | 356/5.01 |
| 2016/0167669 | A1* | 6/2016 | Zhao | B60W 40/06 |
| | | | | 382/195 |
| 2017/0066449 | A1* | 3/2017 | Lee | B60G 17/019 |
| 2017/0129389 | A1 | 5/2017 | Asaoka et al. | |
| 2017/0206660 | A1* | 7/2017 | Trail | G06T 7/521 |
| 2018/0056854 | A1 | 3/2018 | Kunii et al. | |
| 2018/0284774 | A1* | 10/2018 | Kawamoto | B60W 50/10 |
| 2019/0031089 | A1 | 1/2019 | Kunii et al. | |

FOREIGN PATENT DOCUMENTS

| | | |
|---|---|---|
| JP | 2016-002866 A | 1/2016 |
| JP | 2016-109530 A | 6/2016 |
| WO | 2007-102195 A1 | 9/2007 |
| WO | 2016-163293 A1 | 10/2016 |

\* cited by examiner

ROAD SURFACE ASSESSMENT APPARATUS FOR VEHICLE

CROSS-REFERENCE TO RELATED APPLICATIONS

The present application claims priority from Japanese Patent Application No. 2017-176576 filed on Sep. 14, 2017, the entire contents of which are hereby incorporated by reference.

BACKGROUND

1. Technical Field

The present invention relates to a road surface assessment apparatus for use in a vehicle such as a car.

2. Related Art

For support for driving a vehicle such as a car, a technology for adjusting the emission direction of a headlight has been developed. For example, an apparatus that detects a pedestrian around the vehicle and illuminates the pedestrian with a spotlight has been disclosed in Japanese Unexamined Patent Application Publication No. 2006-069298. By this means, it is possible to easily find and view the pedestrian, and therefore to improve the safety of the vehicle during night driving.

SUMMARY OF THE INVENTION

An aspect of the present invention provides a road surface assessment apparatus for a vehicle. The apparatus includes an illumination device, a detector, and an assessment unit. The illumination device is configured to emit pattern light to a road surface on which the vehicle runs, or a surrounding of the vehicle. The detector is configured to detect the emitted pattern light. An assessment unit is configured to assess a condition of the road surface, on a basis of the detected pattern light. The illumination device intermittently emits the pattern light for a short time in such a manner that a period of time for which the pattern light is not emitted is longer than a period of time for which the pattern light is emitted.

An aspect of the present invention provides a road surface assessment apparatus for a vehicle. The apparatus includes an illumination device and circuitry. The illumination device is configured to emit pattern light to a road surface on which the vehicle runs, or a surrounding of the vehicle. The circuitry is configured to detect the emitted pattern light. The circuitry is configured to assess a condition of the road surface, on a basis of the detected pattern light. The illumination device intermittently emits the pattern light for a short time in such a manner that a period of time for which the pattern light is not emitted is longer than a period of time for which the pattern light is emitted.

DETAILED DESCRIPTION

Hereinafter, examples of the present invention will be described with reference to the drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following examples which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same numerals to avoid any redundant description.

A driver should watch not only moving objects such as a pedestrian suddenly appearing, but also unmoving objects such as a road, for example, bumps on the road surface and a change in the shape of the road due to a landslide, accumulated snow and so forth. Then, in order to allow the driver to easily understand such a change in the road situation, an illumination device such as a headlight may emit, for example, grid pattern light to the road surface or the surrounding of the vehicle. Showing a grid pattern formed by straight lines on the road surface or the surrounding of the vehicle may make it easy for the driver to visually recognize the bumps on the road surface and a change in the shape of the road due to a landslide, accumulated snow and so forth, as crooked lines. Here, in order to allow the driver to visually recognize the grid pattern, the illumination device such as a headlight needs to continue to emit grid pattern light. If the headlight continues to emit the grid pattern light, it is necessary to deaden the light emitted to the road surface 30 except grid lines in order to show the grid pattern. As a result, it may be difficult for the driver to visually recognize small bumps on a region of the road surface in which the grid lines are not shown. Then, the driver tries to visually recognize those bumps, and therefore may feel burdened or bothered. Thus, there are pros and cons of continuing to emit the grid pattern light. In addition, when the headlight continues to emit the grid pattern light, the brightness becomes poor, and therefore the illumination performance of the headlight may not be exerted.

It is desirable to provide a road surface assessment apparatus for vehicle capable of easily detecting a change in the road situation such as bumps on the road surface, and a change in the shape of the road due to a landslide and accumulated snow, without bothering the driver.

Example 1

Figure 1:
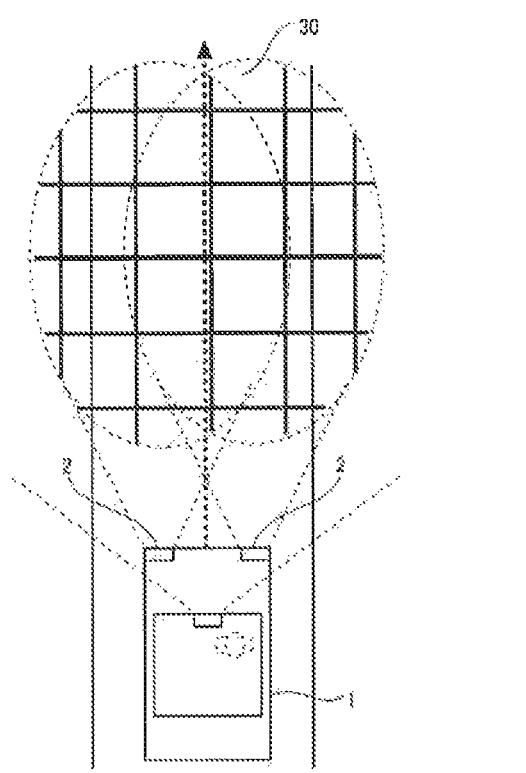
FIG. 1 illustrates a vehicle and a road surface according to Example 1 of the invention.

FIG. 1 illustrates an automobile 1 and a road surface 30 according to Example 1 of the present invention. The automobile 1 illustrated in FIG. 1 is equipped with headlights 2 in the front of a vehicle body. The automobile 1 runs on a road, lighting the headlights 2 based on the operation by the driver, for example, at night. The road surface 30 is illuminated with the light from the headlights 2, and therefore the driver can check the condition of the road surface 30 in the traveling direction.

For support for driving the automobile 1, the emission range and the emission direction of the headlights 2 may be adjusted. For example, a pedestrian around the automobile 1 may be detected, and then illuminated with a spotlight. By this means, it is possible to improve the visibility of the pedestrian, and therefore to improve the safety of the automobile 1 during night driving. However, the driver should watch not only moving objects such as a pedestrian suddenly appearing, but also unmoving objects such as a road, for example, bumps on the road surface 30 and a change in the shape of the road due to a landslide, accumulated snow and so forth.

Then, in order to allow the driver to easily understand such a change in the road situation, an illumination device such as the headlights 2 may emit grid pattern light to the road surface 30 or the surrounding of the automobile 1. Showing a grid pattern formed by straight lines on the road surface 30 or the surrounding of the automobile 1 may make it easy for the driver to visually recognize the bumps on the road surface 30 and a change in the shape of the road due to a landslide, accumulated snow and so forth, as crooked lines. Here, in order to allow the driver to visually recognize the grid pattern, the illumination device such as the headlights 2 need to continue to emit grid pattern light. If the headlights 2 continue to emit the grid pattern light, it is necessary to deaden the light emitted to the road surface 30 except grid lines in order to show the grid pattern.

As a result, it may be difficult for the driver to visually recognize small bumps on a region of the road surface 30 in which the grid lines are not shown. In this case, the driver tries to visually recognize those bumps on the region of the road surface 30 in which the grid lines are not shown. As a result, the driver may feel burdened or bothered. Thus, there are pros and cons of continuing to emit the grid pattern light from the headlights 2. In addition, when the headlights 2 continue to emit the grid pattern light, the brightness becomes poor within the illumination range of the headlights 2, and therefore the illumination performance of the headlights 2 may not be exerted.

In this way, the automobile 1 is required to easily detect a change in the road situation such as bumps on the road surface 30 and a change in the shape of the road due to a landslide and accumulated snow, without bothering the driver.

Figure 2:
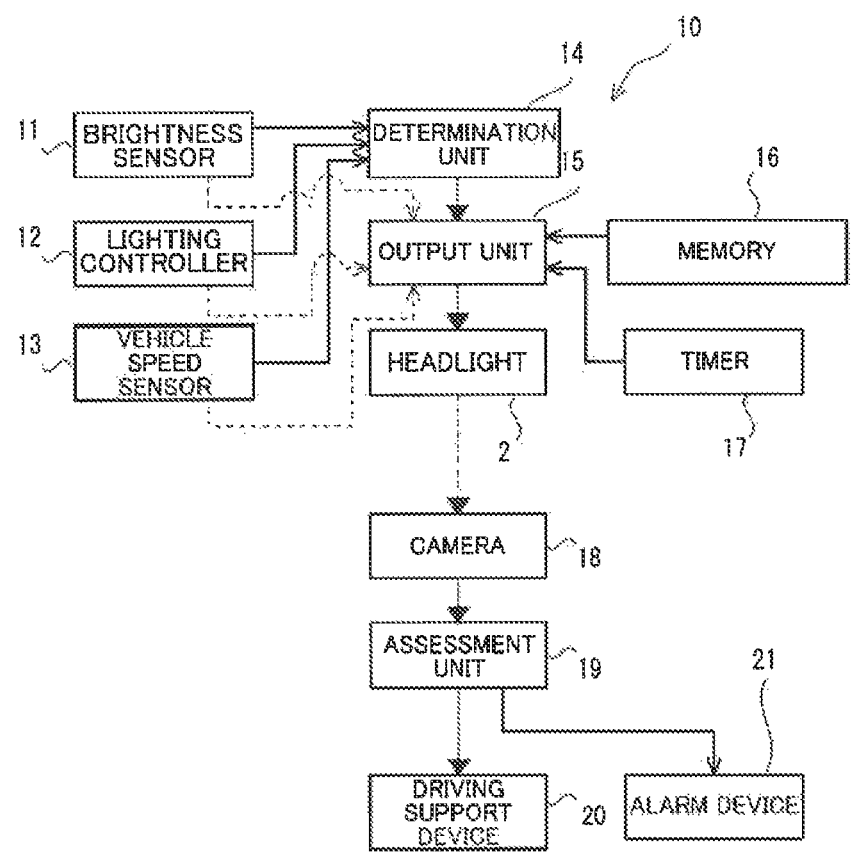
FIG. 2 illustrates the configuration of a road surface assessment apparatus for vehicle according to Embodiment 1.

FIG. 2 illustrates the configuration of a road surface assessment apparatus 10 of the automobile 1 according to Example 1. As illustrated in FIG. 2, the road surface assessment apparatus 10 mounted in the automobile 1 includes a brightness sensor 11, an lighting controller 12, a vehicle speed sensor 13, a determination unit 14, an output unit 15, the headlights 2, a memory 16 configured to store pattern light data, a timer 17, a camera 18, an assessment unit 19, a driving support device 20, and an alarm device 21. Here, the lighting controller 12, the determination unit 14, the output unit 15, the pattern light data memory 16, the timer 17, and the assessment unit 19 may be implemented by a one-chip microcomputer.

The brightness sensor 11 is, for example, a semiconductor optical sensor, which is configured to detect the brightness of the surrounding of the automobile 1. It is preferred that the brightness sensor 11 is provided in, for example, the inside of a windshield to prevent the brightness sensor 1 from being affected by the light from an illumination device such as the headlights 2. By this means, the brightness sensor 11 can correctly detect the brightness of the surrounding of the automobile 1.

The lighting controller 12 controls to turn on and off the headlights 2, based on the operation of the driver. Alternatively, the lightning controller 12 may automatically control to turn on and off the headlights 2, based on the brightness of the surrounding of the automobile 1 detected by the brightness sensor 11.

The headlights 2 are configured to be able to adjust, for example, the emission range, the emission direction, and pattern light to be emitted.

The vehicle speed sensor 13 is, for example, an acceleration sensor or a GPS (global positioning system) receiver, which is configured to detect the running speed of the automobile 1.

The determination unit 14 determines whether it is necessary to emit pattern light, based on input information. The input information may include, for example, the brightness of the surrounding of the automobile 1 detected by the brightness sensor 11, the turn on and off of the headlights 2 by the lighting controller 12, and the running speed of the automobile 1 detected by the vehicle speed sensor 13.

The memory 16 is configured to store pattern light data. The pattern light data may be data of pattern light showing a grid formed by straight lines as shadow, for example, as illustrated in FIG. 1.

The output unit 15 controls the emission of the pattern light from the headlights 2, based on the result of the determination by the determination unit 14. The output unit 15 reads the pattern light data from the memory 16 and causes the headlights 2 to intermittently emit pattern light.

The timer 17 is configured to measure time. For example, the timer 17 measures the period of time for which the headlights 2 emit the pattern light, and the period of time for which the headlights 2 do not emit the pattern light. The timer 17 may measure the cycle for which the headlights 2 emit the pattern light.

The camera 18 is provided in, for example, the inside of the windshield and configured to capture images of the surrounding in front of the automobile. The capturing range of the camera 18 covers the emission range of the headlights 2. By this means, the captured image includes image components of the pattern light emitted to the road surface 30. The camera 18 can detect the pattern light emitted to the road surface 30.

The assessment unit 19 assesses the condition of the road surface 30 such as bumps, based on the difference between the shape of the detected pattern light and the shape of preset pattern light emitted to the flat road surface 30. When the pattern light to be detected is emitted to the flat road surface 30, there is no difference between them. If there is a difference, the road surface 30 may be uneven.

The driving support device 20 performs driving support control to improve the safety of the automobile 1 based on the result of the assessment by the assessment unit 19.

The alarm device 21 is configured to give an alarm to the driver, based on the result of the assessment by the assessment unit 19. The alarm may be given by sound, light, vibrations of the handle and so forth.

The driving support device 20 and the alarm device 21 output the results of the assessment, respectively.

Figure 3:
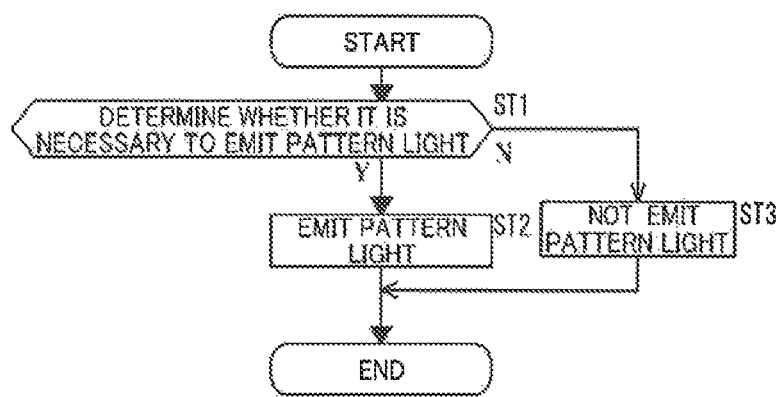
FIG. 3 is a flowchart illustrating an exemplary process of controlling the emission of grid pattern light.

FIG. 3 is a flowchart illustrating an exemplary process of controlling the emission of grid pattern light. The determination unit 14 periodically performs the process illustrated in FIG. 3.

The determination unit 14 first determines whether it is necessary to emit pattern light (step ST1). The determination unit 14 determines that it is necessary to emit the pattern light, for example, when the brightness detected by the brightness sensor 11 is low, or when the lighting controller 12 turns on the headlights 2. In any other case, the determination unit 14 determines that it is not necessary to emit pattern light. Here, the determination unit 14 may determine whether or not it is necessary to emit pattern light, on the premise that the automobile 1 is running. In this case, when the automobile 1 stops, the determination unit 14 determines that it is not necessary to emit pattern light.

When determining that it is necessary to emit pattern light, the determination unit 14 instructs the output unit 15 to emit pattern light (step ST2). The output unit 15 reads pattern light data from the memory 16, and starts to output the pattern light data. After causing the headlights 2 to emit the pattern light, the output unit 15 causes the headlights 2 to continue to emit the pattern light until a predetermined emission period is measured by the timer 17. Then, after stopping the emission of the pattern light, the output unit 15 waits until a predetermined intermittent period is measured by the timer 17, and resumes to emit the pattern light. By repeating the above-described process, the output unit 15 intermittently emits the pattern light. In particular, the output unit 15 causes the headlight 2 to emit the pattern light, for example, for 0.013 seconds, and to stop emitting the pattern light, for example, 0.1 second. In this case, the head lights 2 can emit ordinary light most of the time. In addition, the pattern light is emitted for a significantly short period of time, and therefore the driver cannot visually recognize the pattern light. The same applies to the case where the emission period is shorter than 0.013 seconds.

By this means, the pattern light is emitted to the road surface 30, showing a grid formed by straight lines as shadow, as illustrated in FIG. 1.

When determining that it is not necessary to emit the pattern light, the determination unit 14 instructs the output unit 15 not to emit the pattern light (step ST3). Then, the output unit 15 causes the headlights 2 to stop emitting the pattern light. By this means, the headlights 2 can emit ordinary light.

Figure 4:
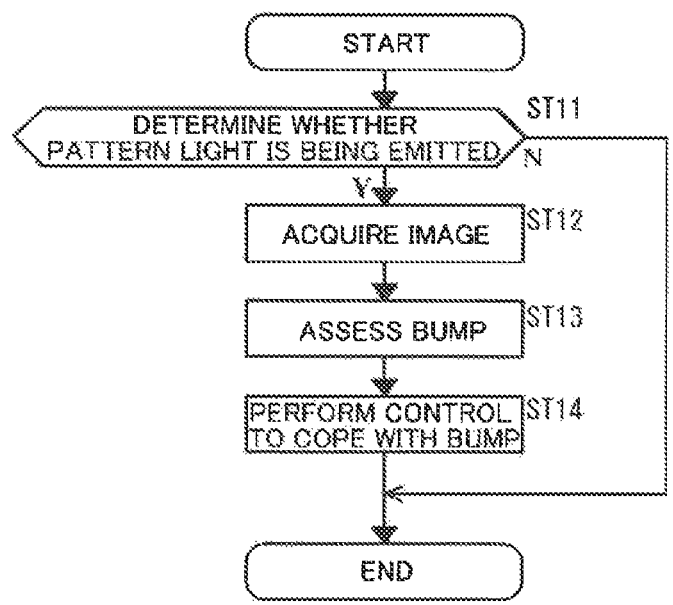
FIG. 4 is a flowchart illustrating an exemplary process of the assessment using grid pattern light.

FIG. 4 is a flowchart illustrating an exemplary process of the assessment using grid pattern light. The assessment unit 19 periodically performs the process illustrated in FIG. 4 while, for example, the determination unit 14 determines that it is necessary to emit the pattern light.

The assessment unit 19 first determines whether the pattern light is being emitted (step ST11). When determining that the pattern light is not being emitted, the assessment unit 19 ends the process illustrated in FIG. 4.

On the other hand, when determining that the pattern light is being emitted, the assessment unit 19 acquires image data from the camera 18 (step ST12). Next, the assessment unit 19 extracts components of the grid formed by the pattern light contained in the image. The assessment unit 19 can extract the components of the grid formed by the pattern light by, for example, applying the edge treatment to the image. By this means, the assessment unit 19 can extract components of the pattern light emitted to the road surface 30. Here, in general, the camera 18 captures images at a predetermined frame rate. For example, when the camera 18 captures images at 100 frames per second, one image is captured for $1/100$ seconds. Therefore, it is preferred that the period of time for which the pattern light is emitted is equal to or longer than the period of time for which the camera 18 captures one image. By this means, the entire pattern light emitted by the headlights 2 can be shown in one of a plurality of images sequentially captured by the camera 18. Consequently, the pattern light clearly appears in the image to a maximum extent.

Next, the assessment unit 19 compares the shape of the extracted grid with the shape of a preset grid, and assesses the difference between them as bumps on the road surface 30 (step ST13). The shape of the preset grid may be the shape of a grid formed by the pattern light which is captured, for example, when the pattern light is emitted to the flat road surface 30. When determining that there are bumps on the road surface 30 in the traveling direction of the automobile 1, the assessment unit 19 instructs the driving support device 20 and the alarm device 21 to perform controls to cope with the bumps (step ST14).

Figure 5:
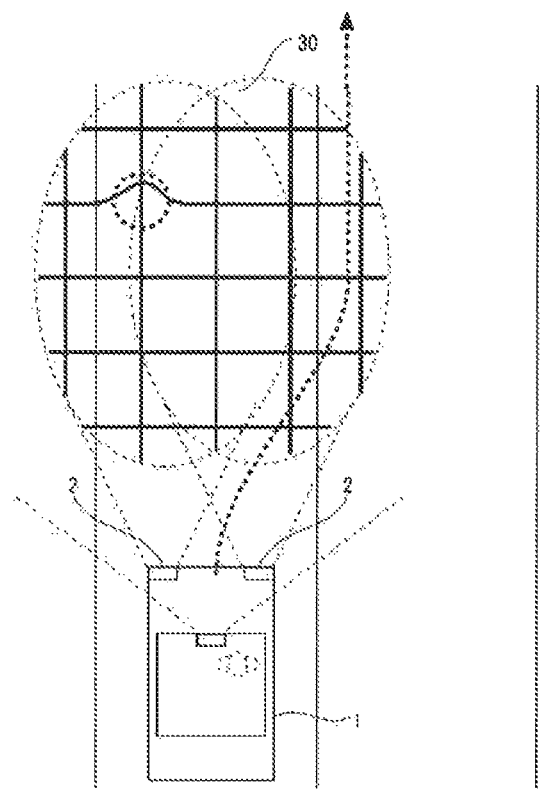
FIG. 5 illustrates an exemplary running control of the vehicle in a case in which the road surface has a bump.

FIG. 5 illustrates an exemplary running control of the automobile 1 in a case in which the road surface 30 has a bump. In the case of FIG. 5, the bump on the road surface 30 in the traveling direction of the automobile 1 can be avoided. The driving support device 20 controls a steering device of the automobile 1. By this means, the automobile 1 can run on a course to avoid the bump illustrated by a heavy dashed line in FIG. 5. Meanwhile, the alarm device 21 gives a warning tone and alarm display. By this means, the driver can understand that the control is performed to avoid an object because there is the bump on the road surface 30.

Figure 6:
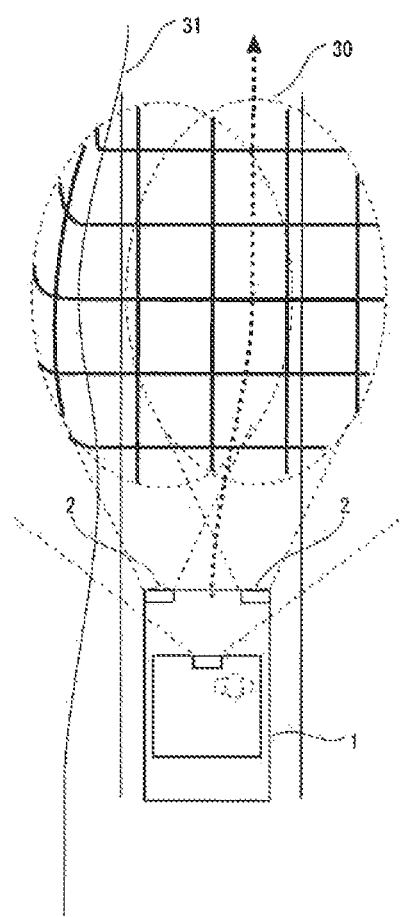
FIG. 6 is an exemplary running control of the vehicle in a case in which the shape of the road is changed due to accumulated snow and so forth.

FIG. 6 illustrates an exemplary running control of the automobile 1 in a case in which the shape of the road is changed due to accumulated snow and collapse of a road shoulder 31. In this case, if the automobile 1 runs on an original lane, the automobile 1 may hit an object on the road shoulder 31 protruding into the road surface 30. To avoid this, the driving support device 20 controls the steering device of the automobile 1. By this means, the automobile 1 can run on a course to avoid the road shoulder 31 illustrated by a heavy dashed line in FIG. 6. Meanwhile, the alarm device 21 gives a warning tone and alarm display. By this means, the driver can understand that the control is performed to avoid a risk because the shape of the road is changed.

As described above, with the present example, the pattern light is intermittently emitted to the road surface 30 for a short time in such a way that the period of time for which the pattern light is not emitted is longer than the period of time for which the pattern light is emitted. Therefore, even when the pattern light is emitted from the moving automobile 1 to the road surface 30 within a range for which the driver can visually recognize, the pattern light may not interfere with the visibility of the driver to recognize the road surface 30. The driver can visually recognize the road surface 30 in the almost same way as when the pattern light is not emitted, and therefore properly understand the condition of the road surface 30. In this way, the pattern light is emitted to the road surface 30 in such a way that the driver does not visually recognize the pattern light, and it is possible to easily detect a change in the road situation such as bumps on the road surface 30 and a change in the shape of the road due to a landslide and accumulated snow.

With the present example, the headlights 2 emit the pattern light to the road surface 30 on which the automobile 1 runs, or to the surrounding of the automobile 1. In addition, the pattern light is intermittently emitted for a short time in such a way that the period of time for which the pattern light is not emitted is longer than the period of time for which the pattern light is emitted. Therefore, the headlights 2 can emit ordinary light for the period of time for which the headlights 2 do not emit the pattern light. As a result, the driver can easily understand the condition of the road surface 30 by visually recognizing the road surface 30 to which the headlights 2 emits ordinary light with the illumination performance of the headlights 2. It possible to easily assess the condition of the road surface 30 while the headlights 2 maintain its illumination performance.

With the present example, the period of time for which the pattern light is emitted is equal to or shorter than 0.013 seconds. That is, the period of time for which the pattern light is emitted is significantly short, and therefore the driver cannot visually recognize the pattern light. As a result, the driver can recognize as if ordinary light is emitted from the headlights 2 with its illumination performance. By this means, the driver may not feel a reduction in the visibility due to the emission of the pattern light, and therefore may not feel bothered. Here, the period of time for which the pattern light is emitted may not necessarily be equal to or shorter than 0.013 seconds. For example, if the emission time of the pattern light is equal to or shorter than 0.026 seconds, it is difficult for the driver to clearly recognize the pattern light. The same applies to the case where the emission time is equal to or shorter than 0.034 seconds.

Example 2

Next, Example 2 of the present invention will be described. Hereinafter, differences from Example 1 will be mainly described. The same components as those in Example 1 are assigned the same reference numerals, and repetitive description will be omitted. With the present example, as indicated by dashed lines in FIG. 2, current detection information is sent from the brightness sensor 11, the lighting controller 12, and the vehicle speed sensor 13 to the output unit 15.

Figure 7:
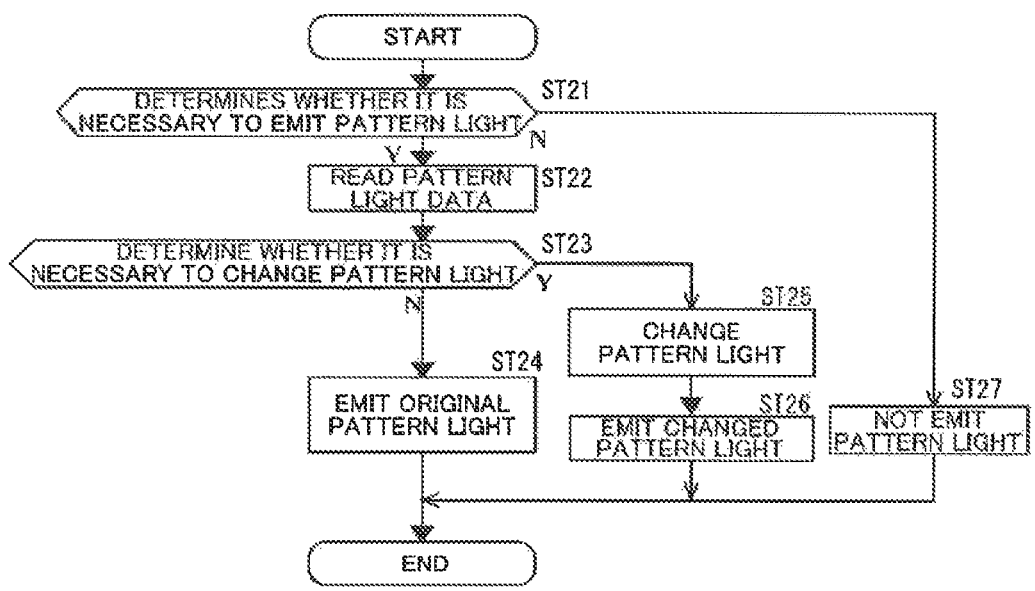
FIG. 7 is a flowchart illustrating an exemplary process of output control of pattern light according to Example 2.

FIG. 7 is a flowchart illustrating an exemplary process of output control of the pattern light according to Example 2. The output unit 15 periodically performs the process illustrated in FIG. 7.

The output unit 15 first determines whether it is necessary to emit the pattern light, based on the result of the determination by the determination unit 14 (step ST21). When determining that it is necessary to emit the pattern light, the output unit 15 first reads pattern light data from the memory 16 (step ST22).

Next, the output unit 15 determines whether it is necessary to change the pattern light (step ST23). The output unit 15 determines whether it is necessary to change the pattern light, based on, for example, the detected brightness of the surrounding, the turn on and turn off of the headlights 2, and the detected running speed of the automobile 1. Then, when determining that it is not necessary to change the pattern light, the output unit 15 causes the headlights 2 to intermittently emit the original pattern light at a preset cycle (step ST24).

On the other hand, when determining that it is necessary to change the pattern light, the output unit 15 performs a process of changing the pattern light to be emitted (step ST25). For example, the pattern, the shape, the size, the emission range, the luminance, the color (reversed), the emission time, the emission cycle of the pattern light, and the lighting state may be changed. The output unit 15 changes the pattern light to be emitted so as to make the pattern light be suitable for being captured, depending on a reason for the change of the pattern light. Then, the output unit 15 causes the headlights 2 to intermittently emit the changed pattern light (step ST26).

For example, the pattern light may be changed depending on the running speed of the automobile 1, and then emitted. When the running speed of the automobile 1 is higher than a standard speed, the distances between the horizontal grid lines along the width direction of the automobile 1 may be increased. In addition, the length of the emission range in the front-to-back direction may be increased so as to show the grid farther away. By the combination of the increase in the distances between the grid lines and the increase in the length of the emission range in the front-to-back direction, it is possible to detect the condition of the road surface 30 over a wide range in the front-to-back direction, without increasing the number of horizontal grid lines so much. In addition, the emission cycle may be shortened. By this means, it is possible to accelerate each of the emission timings, and therefore to detect the change in the road surface 30 farther away at an early stage, and to address the change when the automobile 1 moves at a high speed.

In contrast, for example, when the running speed of the automobile 1 is lower than the standard speed, the distances between the vertical grid lines along the front-to-back direction may be increased. In addition, the width of the emission range in the left and right direction may be increased so as to show the grid farther away in the left and right direction. By the combination of the increase in the distances between the grid lines and the increase in the width of the emission range in the left and right direction, it is possible to detect the condition of the road surface 30 over a wide range in the left and right direction, without increasing the number of vertical grid lines so much.

When determining that it is not necessary to emit the pattern light, the output unit 15 does not emit the pattern light (step ST27).

Figure 8:
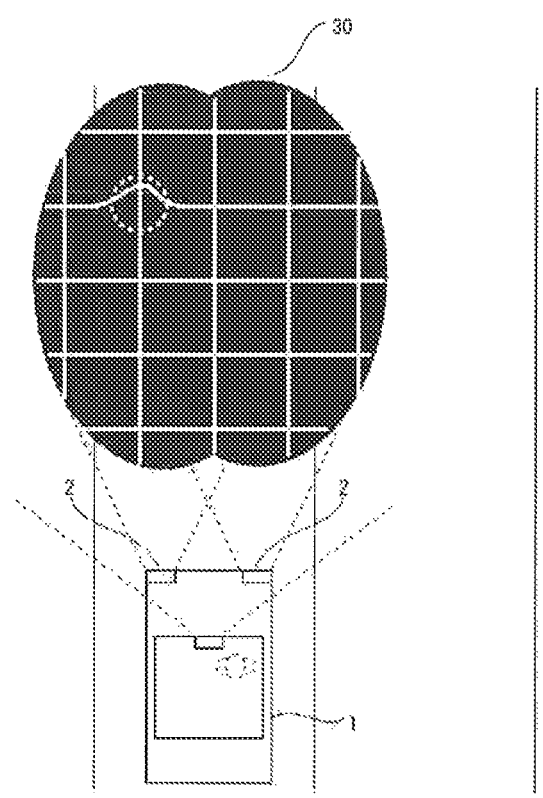
FIG. 8 illustrates an exemplary running control of the vehicle when the color of the grid pattern light is reversed depending on the turn on and off of headlights.

FIG. 8 illustrates an exemplary running control of the automobile 1 when the grid pattern light is reversed depending on the turn on and off of headlights 2. For example, before it gets dark, or the headlights 2 are turned off, the output unit 15 reverses the pattern light showing the grid as shadow. By this means, pattern light data to emit the pattern light to only the grid lines within the emission range is generated. The output unit 15 causes the headlights 2 to emit the reversed pattern light.

Then, the assessment unit 19 extracts components of the grid formed by the pattern light contained in the image captured by the camera 18, and assesses bumps on the road surface 30. The driving support device 20 controls the steering device of the automobile 1 to avoid the bumps on the road surface 30 in the traveling direction of the automobile 1. Meanwhile, the alarm device 21 gives a warning tone and an alarm display.

As described above, with the present example, the running speed of the automobile 1 is detected, and the output unit 15 changes the pattern, the shape, the size, the emission range, the color (reversed), the emission time, the emission cycle of the pattern light, and the lighting state, based on the detected running speed. By this means, it is possible to easily detect a change in the road situation such as bumps on the road surface 30 and a change in the shape of the road due to a landslide and accumulated snow, by using appropriate pattern light depending on the speed and so forth.

With the present example, the headlights 2 emit the pattern light so as to show grid lines as shadow when being turned on, and emit the pattern light so as to draw the grid lines by light when being turned off. By this means, it is possible to easily recognize the grid pattern of the grid lines by the camera 18 even before it gets dark. In addition, when the headlights 2 emit the pattern light while being turned on, the headlights 2 can emit ordinary light to the road surface 30 except the grid lines, and therefore it is possible to prevent the visibility of the driver from being significantly reduced.

While the above-described examples are preferred examples of the present invention, it is to be understood that the invention is not limited to these examples. The present invention is intended to cover various modification and alteration without departing from the spirit and scope of the present invention.

With the above-described examples, for example, the headlights 2 intermittently emit the pattern light. However, this is by no means limiting. The pattern light may be intermittently emitted by an auxiliary light such as a fog light.

With the above-described examples, the headlights 2 intermittently emit the visible pattern light. However, this is by no means limiting. The pattern light of infrared rays or ultraviolet rays which are not visible may be emitted by a dedicated light. The light at non-visible wavelengths cannot be visually recognized by humans, and therefore it is possible to increase the emission period. In addition, it is possible to continuously emit the pattern light depending on circumstances.

With the above-described examples, one type of data is used as the pattern light. However, this is by no means limiting. A plurality of types of pattern light may be used depending on various detections. One of the plurality of types of pattern light may be selected, or the plurality of types of pattern light may be selected at a time and used in sequence.

The invention claimed is:

1. A road surface assessment apparatus for a vehicle comprising:
    an illumination device configured to project a light pattern configuration to a road surface on which the vehicle runs, or a surrounding of the vehicle;
    a detector configured to detect the projected light pattern configuration; and
    an assessment unit configured to assess a condition of the road surface, on a basis of the detected light pattern configuration being compared to a preset light pattern configuration,
    wherein the illumination device intermittently projects the light pattern configuration to the road surface for a time (Te) that is shorter than a period of time (Tl) for which the light pattern configuration is intermittently not projected (Te<Tl), and wherein the assessment unit includes a camera and (Ti≤Te) wherein Ti is an image capture time of the camera.

2. The road surface assessment apparatus for vehicle according to claim 1, wherein the illumination device is a vehicle headlight.

3. The road surface assessment apparatus for vehicle according to claim 2, wherein the illumination device intermittently projects the light pattern configuration for a short time for which the light pattern configuration cannot be recognized by a human but can be detected by the detector.

4. The road surface assessment apparatus for vehicle according to claim 3, wherein the illumination device projects the light pattern configuration for a period of time equal to or shorter than 0.013 seconds for which the light pattern configuration cannot be recognized by a human.

5. The road surface assessment apparatus for vehicle according to claim 3, further comprising a vehicle speed sensor configured to detect a running speed of the vehicle,
    wherein the illumination device changes one of a pattern, a shape, a size, an emission range, a color, an emission time, an emission cycle of the light pattern configuration, and a lighting state, on a basis of the running speed detected by the vehicle speed detector.

6. The road surface assessment apparatus for vehicle according to claim 3,
    wherein the illumination device projects the light pattern configuration so as to show grid lines as shadow within an emission range when being turned on, and projects the light pattern configuration so as to draw the grid lines by light when being turned off.

7. The road surface assessment apparatus for vehicle according to claim 2, wherein the illumination device projects the light pattern configuration for a period of time equal to or shorter than 0.013 seconds for which the light pattern configuration cannot be recognized by a human.

8. The road surface assessment apparatus for vehicle according to claim 2, further comprising a vehicle speed sensor configured to detect a running speed of the vehicle,
    wherein the illumination device changes one of a pattern, a shape, a size, an emission range, a color, an emission time, an emission cycle of the light pattern configuration, and a lighting state, on a basis of the running speed detected by the vehicle speed detector.

9. The road surface assessment apparatus for vehicle according to claim 2,
    wherein the illumination device projects the light pattern configuration so as to show grid lines as shadow within an emission range when being turned on, and projects the light pattern configuration so as to draw the grid lines by light when being turned off.

10. The road surface assessment apparatus for vehicle according to claim 1, wherein the illumination device intermittently projects the light pattern configuration for a short time for which the light pattern configuration cannot be recognized by a human but can be detected by the detector.

11. The road surface assessment apparatus for vehicle according to claim 10, wherein the illumination device projects the light pattern configuration for a period of time equal to or shorter than 0.013 seconds for which the light pattern configuration cannot be recognized by a human.

12. The road surface assessment apparatus for vehicle according to claim 10, further comprising a vehicle speed sensor configured to detect a running speed of the vehicle,
    wherein the illumination device changes one of a pattern, a shape, a size, an emission range, a color, an emission time, an emission cycle of the light pattern configuration, and a lighting state, on a basis of the running speed detected by the vehicle speed detector.

13. The road surface assessment apparatus for vehicle according to claim 10,
    wherein the illumination device projects the light pattern configuration so as to show grid lines as shadow within an emission range when being turned on, and projects the light pattern configuration so as to draw the grid lines by light when being turned off.

14. The road surface assessment apparatus for vehicle according to claim 1, wherein the illumination device projects the light pattern configuration for a period of time equal to or shorter than 0.013 seconds for which the light pattern configuration cannot be recognized by a human.

15. The road surface assessment apparatus for vehicle according to claim 1, further comprising a vehicle speed sensor configured to detect a running speed of the vehicle,
wherein the illumination device changes one of a pattern, a shape, a size, an emission range, a color, an emission time, an emission cycle of the light pattern configuration, and a lighting state, on a basis of the running speed detected by the vehicle speed detector.

16. The road surface assessment apparatus for vehicle according to claim 1,
wherein the illumination device projects the light pattern configuration so as to show grid lines as shadow within an emission range when being turned on, and projects the light pattern configuration so as to draw the grid lines by light when being turned off.

17. The road surface assessment apparatus for vehicle according to claim 16, wherein the light pattern configuration is a grid pattern, as is the preset light pattern configuration.

18. The road surface assessment apparatus for vehicle according to claim 1 wherein the illumination device is a road surface illuminating vehicle travel light, which, in a night driving mode, is maintained in a constant on state during periods of both on and off projection states of the light pattern configuration.

19. A road surface assessment apparatus for a vehicle comprising:
an illumination device configured to project a light pattern configuration to a road surface on which the vehicle runs, or a surrounding of the vehicle; and
circuitry configured to
detect the projected light pattern configuration, and
assess a condition of the road surface, on a basis of the detected light pattern configuration being compared to a preset light pattern configuration,
wherein the illumination device intermittently projects the light pattern configuration for a time (Te) that is shorter than a period of time (Tl) for which the light pattern configuration is intermittently not projected (Te<Tl), and wherein the assessment unit includes a camera and (Ti≤Te) wherein Ti is an image capture time of the camera.

* * * * *